United States Patent [19]

Narayan et al.

[11] Patent Number: 5,764,314
[45] Date of Patent: Jun. 9, 1998

[54] MECHANICAL PACKAGING AND THERMAL MANAGEMENT OF FLAT MIRROR ARRAYS

[75] Inventors: Chandrasekhar Narayan, Hopewell Junction; Evan Colgan, Suffern; Kei-Hsiung Yang, Katonah; Robert L. Melcher, Mt. Kisco; Lawrence S. Mok, Brewster; Leathen Shi, Yorktown Heights; Thomas M. Cipolla, Katonah, all of N.Y.

[73] Assignee: International Business Machines Corporation, Armonk, N.Y.

[21] Appl. No.: 754,927

[22] Filed: Nov. 25, 1996

Related U.S. Application Data

[62] Division of Ser. No. 540,860, Oct. 11, 1995.

[51] Int. Cl.⁶ .................................................. G02F 1/1333
[52] U.S. Cl. ....................................................... 349/58
[58] Field of Search ............................. 349/187, 191, 349/188, 57, 58, 60

[56] References Cited

U.S. PATENT DOCUMENTS

| | | |
|---|---|---|
| 3,374,537 | 3/1968 | Doelp et al. . |
| 4,025,942 | 5/1977 | Kurtz . |
| 4,436,378 | 3/1984 | Kirkman . |
| 4,470,856 | 9/1984 | Little et al. . |
| 4,655,600 | 4/1987 | Tanigawa .................... 356/401 |
| 4,763,993 | 8/1988 | Vogeley et al. . |
| 4,769,680 | 9/1988 | Resor, III et al. ............ 355/43 |
| 4,772,100 | 9/1988 | Sunenaga . |
| 4,821,282 | 4/1989 | Podgorski . |
| 4,865,451 | 9/1989 | Ahonen et al. . |
| 4,876,588 | 10/1989 | Miyamoto . |
| 4,999,619 | 3/1991 | Te Velde . |

(List continued on next page.)

FOREIGN PATENT DOCUMENTS

| | | |
|---|---|---|
| 0 574 137 | 12/1993 | European Pat. Off. . |
| 0 586 147 | 3/1994 | European Pat. Off. . |
| 57-17281 | 1/1982 | Japan . |
| 1-169424 | 7/1989 | Japan . |
| 2-284115 | 11/1990 | Japan .................... 349/187 |
| 4-21821 | 1/1992 | Japan .................... 349/187 |
| 5-107519 | 4/1993 | Japan . |
| 2 238 419 | 5/1991 | United Kingdom . |

OTHER PUBLICATIONS

Patent Abstracts of Japan, JP-07-120781.
K. Kasahara et al. "A Liquid-Crystal TV Display Panel Using a MOS Array wth Gate-Bus Drivers". 1980 Biennial Display Research Conference. pp. 96-101.
W.A. Warwick. "Packaging of Silicon Integrated Passive Display". IBM Technical Disclosure Bulletin. vol. 24, No. 7A. pp. 3210-3211 (1981).

*Primary Examiner*—William L. Sikes
*Assistant Examiner*—James A. Dudek
*Attorney, Agent, or Firm*—Scully, Scott, Murphy & Presser

[57] ABSTRACT

A liquid crystal element, a packaging structure providing thermal and alignment control, a display device including the same, and methods of fabrication and assembly are provided. The liquid crystal element includes: a semiconductor wafer, having microcircuitry and an array of reflective pixels; a layer of electro-optical responsive liquid crystal medium, of uniform thickness, disposed on the reflective pixels; a transparent conductive layer positioned on the liquid crystal, being substantially parallel to the reflective layers, to ensure a uniform thickness of the liquid crystal; and an insulative transparent layer provided on the conductive layer. The liquid crystal element is laminated to an optically flat substrate to limit the out-of-plane distortions thereof. The structure formed by element and substrate are disposed in a substrate holder which is mounted to a wiring board, and coupled to voltage sources for actuating the liquid crystal. During mounting, an aligning fixture is used to ensure proper orientation of the element relative to the related optical elements. Once the element is positioned, a heat sink is coupled to the rear surface of the substrate holder to dissipate heat.

10 Claims, 6 Drawing Sheets

U.S. PATENT DOCUMENTS

| | | |
|---|---|---|
| 5,032,021 | 7/1991 | Kanatani et al. . |
| 5,158,490 | 10/1992 | Kong . |
| 5,170,194 | 12/1992 | Kurematsu et al. . |
| 5,170,195 | 12/1992 | Akiyama et al. . |
| 5,206,749 | 4/1993 | Zavracky et al. . |
| 5,317,236 | 5/1994 | Zavracky et al. . |
| 5,407,519 | 4/1995 | Joffe et al. .................... 156/358 |
| 5,587,817 | 12/1996 | Miyamoto et al. ................ 349/58 |

MECHANICAL PACKAGING AND THERMAL MANAGEMENT OF FLAT MIRROR ARRAYS

This application is a division of application Ser. No. 08/540,860 filed Oct. 11, 1995 which application is now pending.

BACKGROUND OF THE INVENTION

1. Field of the Invention

The present invention relates to the construction, mechanical packaging, and thermal management of flat mirror arrays for reflection projection displays, and more specifically to the assembly of substantially flat liquid crystal semiconductor spatial light monitors on a surface, in alignment with the optical and electrical components and such thermal sinking devices as are necessary for use with liquid crystal display elements.

2. Description of Prior Art

Projection apparatus which utilize the optical characteristics of liquid crystals are well known in the art. A generalized liquid crystal display consists of a source of light, having frequency components of the full visible spectrum, which is directed at a series of filters which separate the light into red, blue, and green component beams. The component beams are then directed to interact with an optically reactive liquid crystal medium, which alters the component beams in accordance with specific image information. The altered beams are reconstituted and either transmitted directly onto a screen, or may be projected through a lens.

The interaction of the component beams with the optically reactive liquid crystal elements, and the elements themselves, may be categorized as either transmissive or reflective. In a transmissive liquid crystal element, a quantity of an electrically active liquid crystal medium is positioned between a pair of spaced optically transparent surfaces. Each of the transparent surfaces further includes an inner surface electrode which permits the application of a voltage across the liquid crystal, therein altering the optical characteristics of the medium, for example, from transparent to absorptive (or scattering) in the frequency of the specific beam. It is understood that the image information necessary to provide a meaningful picture is provided by the appropriate variation of the voltage across the element.

Reflective liquid crystal elements are similar to transmissive ones, but for the fact that only one of the spaced surfaces is optically transmissive. The other surface is reflective. In such an element the component beam of light is directed through the transmissive surface and the liquid crystal, reflects off the far reflective surface, passes back again through the liquid crystal medium and the transmissive surface, and thereby may be properly encoded with image information in accordance by variance of the transmissive state of the liquid crystal.

There are many critical design requirements of reflective liquid crystal elements, which must be met in order to construct a specific device which is functional for the variety of applications for which reflective liquid crystal displays are intended. Three of these requirements are, thermal control, reflective surface flatness, and consistent alignment with other optical elements.

The first of these, which is thermal control, is a requirement common to both transmissive and reflective liquid crystal elements. The transmission, scattering, and absorption of incident light by the liquid crystal medium, as well as the resistive heating associated with the voltage drop thereacross, entails a buildup of heat. Inasmuch as the performance of liquid crystals are substantially sensitive to temperature, and may be disrupted by such temperature fluctuations as associated with the above mentioned heating effects, cooling means must be provided.

A number of methods and structures have been taught in the art which are capable of providing sufficient cooling for liquid crystals such that the use of color liquid crystal displays has been widespread. For example, U.S. Pat. No. 5,170,195 to Akiyama et al. teaches a cooling device comprising a container filled with a liquid coolant fluid and outwardly extending heat fins. The container, which is constructed of transparent materials, is disposed in contact with the face of a liquid crystal display element, therein receiving the heat from the element and providing a cooling effect therefor. Such a cooling system, however, is considerably more bulky than would be otherwise desired. In addition, the manufacturing of such a device necessitates substantially more complexity than is desirable for a competitively marketed display system.

U.S. Pat. No. 5,170,1945, to Kurematsu et al. comprises a liquid crystal display element, which is a reflective type, consisting of a top optically transmissive surface, a quantity of voltage sensitive liquid crystal material, and a rear reflective surface which forms the front surface of a heat sink element. Stated alternatively, the reflective surface of the reflective liquid crystal element is the aluminum surface of a heat sink element. The cooling of the element is, therefore, provided directly to the liquid crystal by virtue of its contact with the heat sink.

While the Kurematsu et al. device is a functional solution to the problem of overheating in reflective liquid crystal elements, the manufacturing of liquid crystal elements having a bulky heat sink attached directly to the liquid crystal element has considerable difficulties related to alignment, surface preparation, and in the ultimate assembly thereof. It is, therefore, an impractical solution.

The second design requirement, which is the flatness of the reflective surface, is, by definition, a problem associated with reflective surfaces only. CMOS technology has been identified as an ideal fabrication method for constructing the high performance transistor arrays, which entails the building up of material on the surface of high quality single crystal silicon. Lattice mismatching, as well as thermal expansion characteristics can generate significant stresses in the underlying substrate material (the silicon), therein causing significant bowing of the mirrored surface. The bowing, which translates to a non-planarity of the surface, causes both (1) a non-uniform thickness of the liquid crystal layer between the bowed reflective surface and the planar transmissive top layer, and (2) variations in the path length of the reflected light from different parts of the element, and of the array. These effects compromise the electro-optic properties of the elements and/or array.

Finding a solution to the above, and therein meeting the flatness requirement, contributes considerably to meeting the third requirement of the reflective liquid crystal elements which is providing for consistent alignment of the reflected component beam with other optical elements. In addition, the liquid crystal elements must be practically positionable in their array such that the reflective surfaces are properly oriented with respect to both their respective optics, and with respect to one another.

The gross alignment requirements demonstrate a further reason why the structure taught by Kurematsu et al. in U.S.

Pat. No. 5,170,194, to Kurematsu et al. is unfit for practical use in a high volume fabrication scheme. The size, shape, and weight of the heat sink element, which is also the surface providing the reflectivity of the element, makes the proper alignment of each element difficult. The uniformity of tolerances necessary for a functional display are incompatible with such bulky elements.

It is, therefore, a principal object of the present invention to provide a reflective liquid crystal display element having sufficient cooling means to prevent disruption of the proper function of the liquid crystal material.

It is further an object of the present invention to provide a mirror array, for use in a reflective liquid crystal display element, having a substantially flat surface, therein providing for proper reflective angulation of the light directed thereon.

It is still further an object of the present invention to provide a liquid crystal display element having a substantially uniformly layered reflective surface, liquid crystal medium, and transmissive layer so that the electro-optic response of the element is not compromised.

It is another object of the invention to provide a liquid crystal display element which is sufficiently positionable such that the manufacture of a plurality thereof, set forth in an array which is uniformly in proper alignment with their additional optical elements, is practical and feasible within a commercially viable fabrication scheme.

SUMMARY OF THE INVENTION

These and other objects of the present invention are achieved by the fabrication of a reflective liquid crystal display element having a substantially flat mirror surface, a corresponding uniform liquid crystal, a separately mounted thermal heat sink, and an enhanced packaging so that the elements may be set forth in an array which is properly aligned with optical elements associated therewith.

More particularly, with respect to the fabrication of the substantially flat mirror surface, this invention teaches a structure comprising a semiconductor substrate, for example a silicon wafer, having circuitry disposed on the surface thereof, which has formed thereon an optically reflective surface layer. The semiconductor may be diced into a multiplicity of properly sized elements, each of which is laminated to an optically flat surface. The lamination of the mirrored semiconductor elements is preferably done with a spin-on or spray-on liquid adhesive which cures in place, or alternatively with an adhesive film. In either of these cases, or additional alternative means which may be found compatible, it is understood that the joint must be capable of both surviving all such thermal cycles and solvent treatments as are necessary to fabricate the liquid crystal element, and efficiently transferring heat such that the temperature gradient associated with the cooling means (such as are described hereinafter) is sufficiently small, therein protecting the functionality of the liquid crystal.

In order that the thermal expansion characteristics of the semiconductor do not cause secondary warping of the mirrored surfaces, subsequent to the lamination thereof, the substrate is preferably chosen to have a similar coefficient of thermal expansion. An ideally suitable material for the optically flat surface, for use with a silicon semiconductor substrate, is polished ground glass. Ceramic, silicon, or metal substrate materials may also be used as the optically flat substrate.

With respect to the fabrication of a uniformly thick layer of liquid crystal on the mirrored substrate, the preparation of the substrate as described above provides a flat surface onto which the liquid crystal is disposed. The spacing of a flat transmissive layer, such as glass, in parallel alignment with the substrate layer provides a uniformly thick region of liquid crystal. This uniform thickness is provided by an accurately positioned edge seal which secures the substrate and the transmissive top layer together in spaced relation to one another.

With respect to the provision of a sufficient heat sink, which provides cooling to the liquid crystal elements, the present invention further comprises a substrate holder on which the liquid crystal element rests. Any gaps between the holder and the element are filled with a thermal paste. Once the assembly of element and holder are affixed to the printed wiring board to which it is mounted for display purposes (the mounting process and the corresponding superior alignment characteristics of this invention are set forth hereinbelow), a heat sink is attached to the rear surface of the substrate holder, whereby the heat buildup within the element can be efficiently removed.

With respect to the mounting process and the corresponding superior alignment characteristics of the present invention, it is understood that an array of multiple liquid crystal elements, as set forth above, is required in order to reproduce a complex image, for example a high definition television picture, or a complex video display screen. Once the substrate holder has received the liquid crystal element, it is loosely attached to the printed wiring board with mounting means which remain untightened so that there remains a small amount of movement. At this time the electrical interconnections may be established. The wiring board comprises a series of spaced cut-out sections in which the liquid crystal elements are disposed when the substrate holders are properly positioned.

Once the circuitry, which controls the voltage supplied to each of the elements, has been connected, an alignment fixture is coupled to the entire array (or a portion thereof) to ensure that the elements are properly aligned to the optics. Once the elements are properly aligned, the means for securing the substrate holders to the wiring board are fully tightened, and the fixture is removed. Once fully connected and positioned, heat sinks are attached to the rear of the substrate holder.

DETAILED DESCRIPTION OF PREFERRED EMBODIMENT

Figure 1:
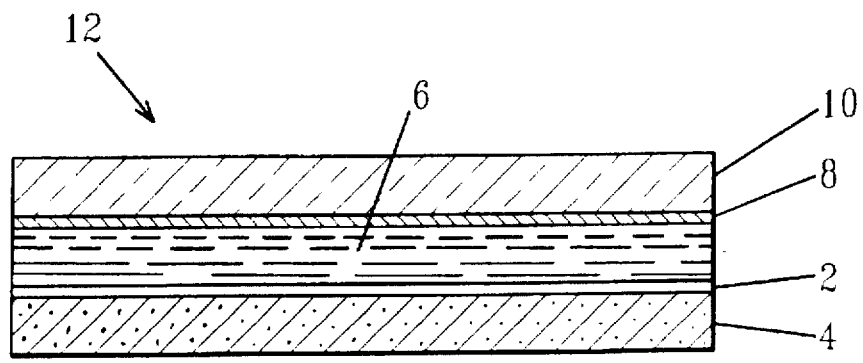
FIG. 1 is a side cross-section conceptual view of a reflective liquid crystal display element.

Referring now to FIG. 1, a side cross-section conceptual view of a reflective liquid crystal display element 12, is shown. A reflective layer 2 is deposited on a base material 4, which provides a backing for the reflective layer 2. In the present invention the backing layer 4 further comprises microcircuitry for providing a voltage, as will be more fully set forth below with respect to FIG. 2. It is desirable that the reflective layer 2 comprise a conductive material. If the reflective layer 2 is not conductive, it is necessary to provide a transparent conductive layer (not shown) across the reflective surface.

On top of the reflective layer is disposed a liquid crystal fluid medium 6 which is electro-optically active. In practice, one type of liquid crystal medium 6 permits the polarized light to be reflected without any rotation of the polarization orientation when there is an absence of voltage thereacross, and reflects the light and rotates the polarization when a given voltage is applied thereacross. By suitably using an analyzer in the reflected light path, the displayed image may selectively presented as bright or dark depending upon which polarization the analyzer allows to pass. In a different embodiment, which does not employ polarized light, the incident light may be diffusely scattered in correspondence with the application of a voltage while permitting the light to go through when no voltage is applied. The reverse situation of the liquid crystal medium causing scattering with no voltage and being transparent under applied voltage is also a variation. This liquid crystal layer 6 is generally maintained at a specific thickness, as described more fully hereinbelow, also with respect to FIG. 2, so as to ensure constant optical properties and effects across the breadth of the element.

Above the liquid crystal medium 6 are sequentially positioned a transparent conductive layer 8 and a transparent insulator layer 10, respectively. The transparent conductive layer 8 may be a separate and distinct material, such as a conductive polymer, however, it is preferable that the layer 8 comprise an electrically conductive oxide formed on the bottom side of the transparent insulator layer 10.

The function of the reflective liquid crystal element 12 described hereinabove is best understood with respect to the additional features of such a display device. An external light source (not shown) is directed onto the element 12, through transparent layers 10 and 8 and through the liquid crystal medium 6. If a voltage is applied across the liquid crystal 6, therein causing the polarized light to be rotated, the reflected light passes through the analyzer, to the observer. If the voltage is not applied, the light is reflected without rotation an does not pass through the analyzer and therefore appears dark to the observer. For a color display, each of the element corresponds to one of three colors: green, blue, or red. The composite of three images, each of a different color are provided, therein forming a full color image.

Figure 2:
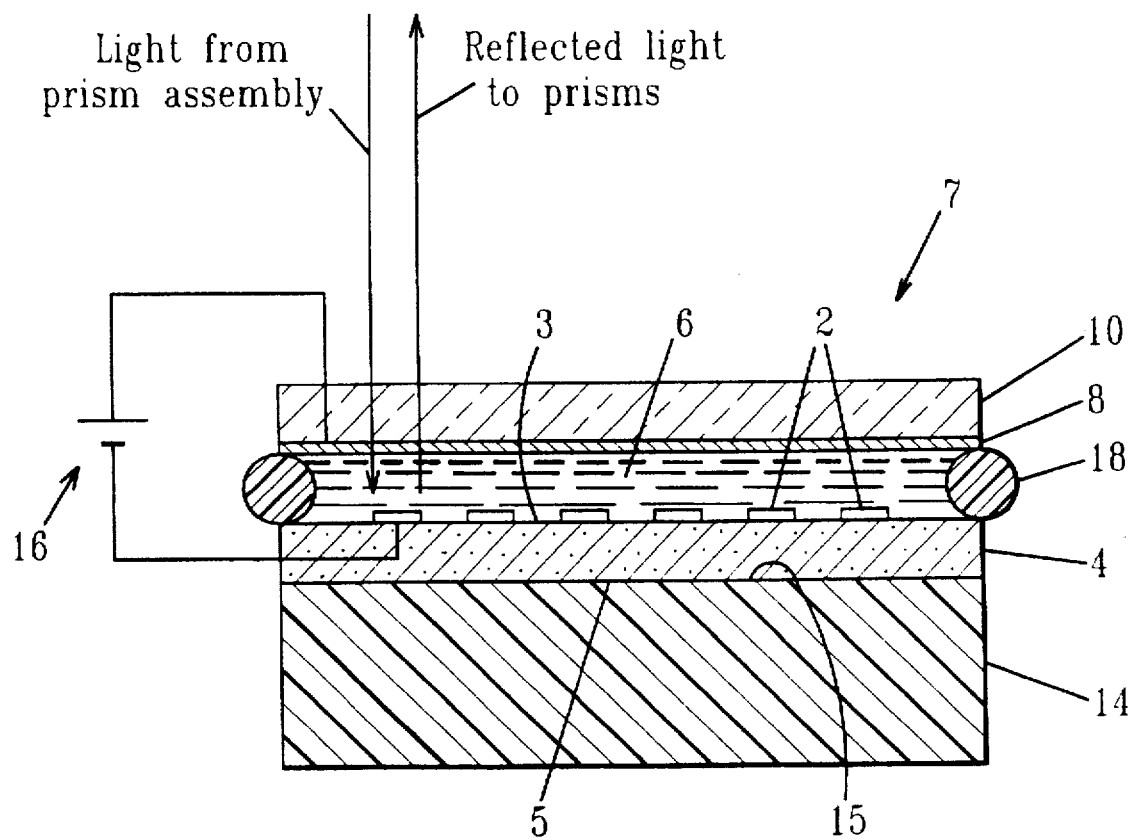
FIG. 2 is a side cross-sectional view of the reflective liquid crystal display structure of the present invention wherein the mirror array is joined to an optically flat substrate.

Referring now to FIG. 2, which shows a side cross-sectional view of the specific structure 7 of the present invention, which ensures that the underlying backing layer, which in this embodiment is a semiconductor wafer 4 having circuitry disposed thereon (not shown), remains uniformly flat is herein described. The wafer 4 has front and rear surfaces 3 and 5 respectively. After fabrication of a reflective layer 2, in the form of mirror pixels, on the front surface 3 of the semiconductor wafer 4, the wafer is diced to the required dimensions and laminated to a substrate 14 having an optically flat surface 15 to give the global flatness to the array. The substrate 14 must be sufficiently rigid to resist out-of-plane distortion of the wafer 4.

The lamination of the wafer 4 to the optically flat substrate 14 may be achieved by a variety of means, however, in a preferred embodiment the lamination is provided by a spin-on or spray-on liquid adhesive layer that cures in place by light or heat such that additional fabrication steps are not required beyond the joining of the wafer 4 to the substrate 14. It is further understood that the joining means must be capable of surviving all of the thermal cycles and solvent treatments associated with the subsequent manufacture of a liquid crystal element.

Preferred optically flat substrates 14 include, but are not limited to, ground polished glass, wherein the thermal expansion coefficient of the glass is equivalent to that of the wafer 4. In alternative designs, it may be preferable to use polished metal or ceramic materials as the substrate. It is further understood, that thick and rigid silicon may be utilized as a substrate material as well.

A particularly suitable example of the proper fabrication of the structure described above comprises laminating a bowed silicon wafer 4 to a polished flat glass substrate with a thermosetting adhesive. In this example, the lamination is preferably carried out in a gas pressure cell where uniform gas pressure is applied over the whole surface at 200 degrees centigrade. In such an example, the degree of flatness of the reflective layer 2 on the surface of the wafer 4 may be maintained within the required tolerances for the intended liquid crystal application.

Once the wafer 4, and the reflective layer 2 disposed thereon, have been joined properly, an edge sealing material 18 is disposed such that the liquid crystal 6 may be applied to the reflective surface in partitioned spacings. In addition, the sealing material 18 supports and secures to the conductive and insulative transparent layers 8,10, respectively, with the liquid crystal in between, therein holding the element together. The spacing of the transparent layers 8,10 from the reflective layer 2 must also be maintained at proper distance tolerances such that the liquid crystal layer has a uniform depth across the array. In other words, the reflective layer 2 and the transparent layers 8,10 must be substantially parallel to one another.

The uniform thickness of the liquid crystal is critical to the proper performance of the display element because of two factors. The first is that the optical path of the incident light through, and back through, the liquid crystal layer must be the same distance at all points along the array in order to prevent nonsymmetric angulation of the beams at the optical elements which merge the mono-chromatic beams together. The second factor compelling the maintenance of a constant thickness through the liquid crystal layer 6 is that the electro-optical characteristics of the liquid crystal are directly related to the voltage applied thereacross. Voltage is applied across the liquid crystal via terminals of an external voltage source 16, coupled to the conductive transparent layer 8 and the microcircuitry imprinted on the wafer 4. Equivalent voltage drops across two regions of liquid crystal, one of which is thicker than the other, cause different intensity of molecular alignment shifts. The voltage gradient across the thicker region is necessarily less than the gradient across the narrower region, therein causing a reduced optical effect in the liquid crystal. In the narrower region, a sharper voltage gradient causes a more intense orientation shift of the molecules. For these reasons, it is preferable that all of the layers be as substantially parallel as possible.

Figure 3:
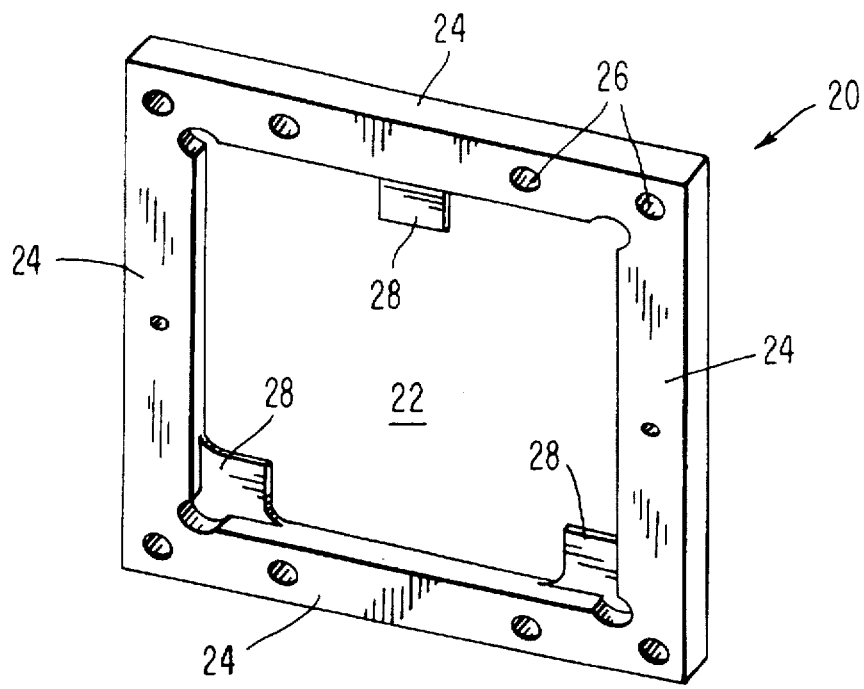
FIG. 3 is a perspective view of a substrate holder of the present invention.

As discussed above, assembly of the display requires that each element be accurately aligned to the color combining optics, be properly coupled to its electrical voltage source, and have a structure which provides adequate temperature stabilization so that the performance of the element is not degraded by power dissipation within the element. Referring now to FIG. 3, an alignment and support structure, which includes a substrate holder 20 is shown. The substrate holder 20 comprises a dish-like structure having a square perimeter conformation, wherein the interior 22 of the region is thinner than the perimeter. The four elongate sides 24 of the structure include regularly spaced screw holes 26 for mounting of the holder 20, and the structure 7 therein, to a wiring board (as described more fully with respect to FIG. 5). Extending into the thinner region 22 of the substrate holder 20, are provided a plurality of support pads 28 on which the structure 7 is designed to rest. In the presently illustrated embodiment, three support pads 28 have been chosen, therein providing the ideal number of points on which to define planarity of the surface.

The substrate holder 20 is ideally made of a good heat conducting material, such as a metal, so that the structure 7 will not be insulated as it builds up heat. In addition, the gap formed by the pads 28 between the substrate and the substrate holder is filled with a thermal paste which further increases the rate at which the dissipated power within the element can be removed by heat sinking means (as described more fully hereinbelow with respect to FIG. 4).

Figure 4:
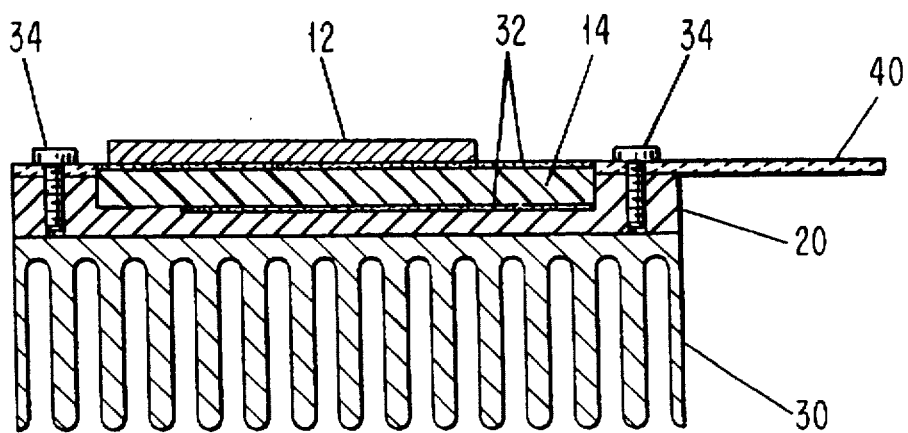
FIG. 4 is a side cross-section view of the element, substrate, and substrate holder mounted to a wiring board, wherein a heat sink is coupled to the rear of the assembly.

Referring now to FIG. 4, a cross-sectional view of the liquid crystal display element 12 and the substrate holder 20 having a heat sink device 30 coupled to the rear side of the holder 20, and being mounted to a wiring board 40 is provided. As described above, the element 12 is disposed on the optically flat substrate 14, which is in turn coupled to the substrate holder 20 via an adhesive thermal paste 32. The substrate holder 20 is coupled to a wiring board 40 by a set of coupling screws 34 which are disposed through the wiring board into the screw holes 26 of the holder 20. The wiring board includes cut-out sections formed therein (see FIG. 5), about which the substrate holders 20 are coupled, and in which cut-out sections the display elements 12 are positioned so that they are in light receiving position with the remainder of the optical elements in the display device.

Figure 5:
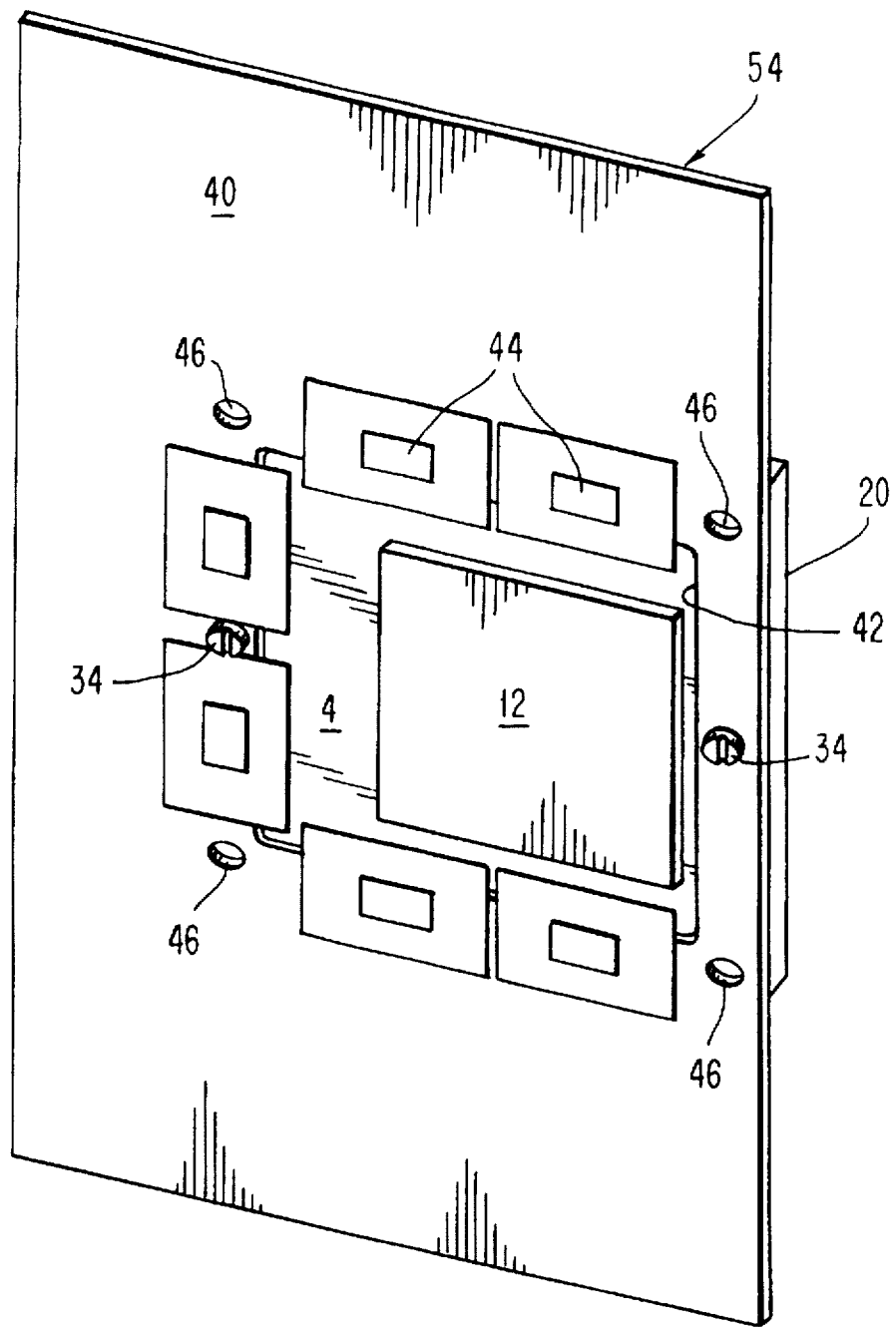
FIG. 5 is a perspective view of the wiring board, having the substrate holder loosely mounted thereto, therein corresponding to one step of the assembly process.

Referring now to FIG. 5, the wiring board 40 is shown, having a liquid crystal element 12 mounted in a cut-out section 42 thereof, is shown in a perspective view. The region of the wiring board 40 which is adjacent to the cutout section 42 includes a plurality of electrical connection pads to which the proper electrical connections (not shown) may be made to provide coupling to the driver chips 44 to drive the element 12. In the area surrounding the cut-out section 42, screw holes 46 are further provided which are mateable to the substrate holder 20 by screws 34, as described above.

Figure 6:
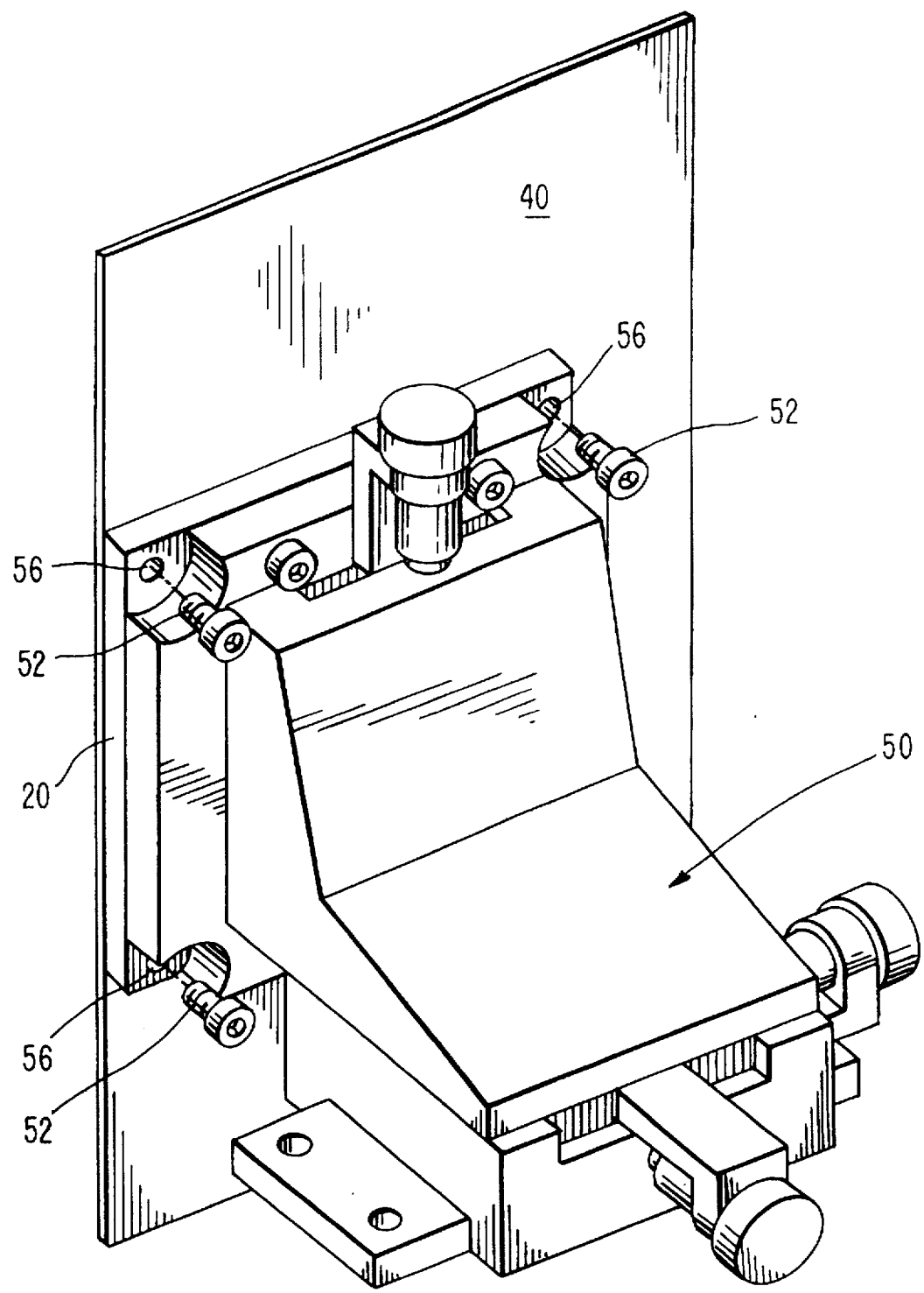
FIG. 6 is a perspective view of the wiring board wherein a mounting and alignment fixture is shown coupled to the rear of thereof for properly orienting the element relative to associated optical devices, in accordance with another step in the assembly process of the present invention.

In order to make the electrical connection of the driver chips 44 to the wiring board 40, the driver chips 44 are first attached to the semiconductor wafer 4 which is known in the art. Then, the element 12, with driver chips 44 attached, must be precisely oriented on the wiring board 40. In this aligned position the electrical connection of the driver chips 44 to the wiring board 40 is made. Referring now to FIG. 6, an alignment fixture 50, which is mountable to the rear of the substrate holder 20, as described above, is shown in a perspective view using the alignment fixture 50 while holding the wiring board 40 stationary. Once the substrate holder 20 and the element 12 mounted therein with driver chips 44 attached have been placed against the wiring board 40, with the driver chips 44 aligned to the electrical connection pads on wiring board 40. It is understood that the alignment fixture 50 may be of a slightly different configuration depending on the configuration of the device forming the electrical connections. For example, the wiring board and element assembly may be held horizontally instead of vertically, as shown, or the assembly fixture may contain rotary capability.

It is understood that at this point in the assembly process, the screws 34 which secure the substrate holder 20 to the wiring board 40 are kept loose, such that the element may be set to its ideal alignment. Once the alignment fixture 50 has been used to properly orient the elements, the screws 34 may be tightened to secure the substrate 20 in the ideal position.

In order to mount a plurality of liquid crystal elements 12 in proper alignment with remote optical elements, for example three elements each dedicated to a specific color and are aligned to projection optics to form a single color image, each assembly of liquid crystal elements 12 with driver chips 44 and wiring board 40 attached (shown as element 54 in FIG. 5) must be precisely oriented to the projection optics. With an alignment fixture 50 attached to each of the several assemblies 54, such alignment can be achieved.

Once the alignment is achieved for each assembly 54, the assembly can be attached in this aligned position to a mounting structure (not shown) by means of screws 52 (or other suitable releasable mounting means) through holes 56 in the substrate holder 20 and holes 46 in the wiring board 40. It is understood that holes 56 and each corresponding hole 46 are nominally aligned to each other to form individual holes through the substrate holder and wiring board through which a screw may be passed through both elements. It is further understood that there is sufficient clearance between the holes and screws so that small motions of alignment of the assembly 54 can be accomodated while still being able to attach the assembly to a mounting structure in its aligned position by means of the screws 54. It is further understood that the alignment fixture 50 may be of a different configuration that that shown depending on the mounting structure used and the requirements of the particular application. The alignment fixture 50 used for alignment of the electrical connections described above may also be a separate structure from the alignment fixture used to align an assembly 54 to remote optical elements.

Figure 7:
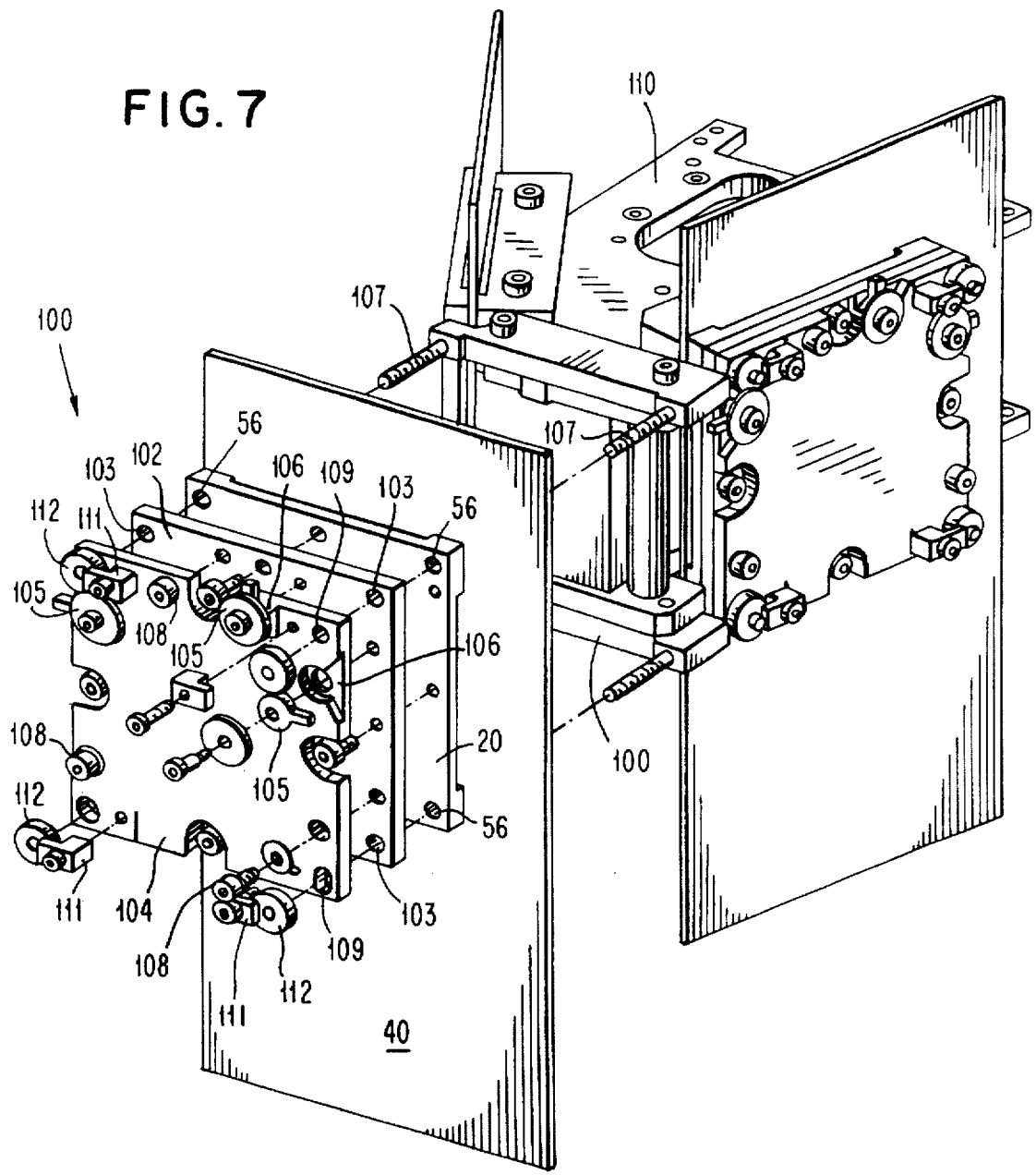
FIG. 7 is an exploded view of a top perspective of another alignment fixture which is an aspect of the present invention.

Referring now to FIG. 7, a robust alignment fixture 100 for properly orienting the liquid crystal elements 12 with respect to one another such that the images which they project are superimposed on each other to form a single image is shown. It is understood, as stated above, that this proper orientation may be achieved with the use of an alignment fixture which can alter the position of the elements 12 in the horizontal direction, the vertical direction, and may further impart a rotation to the element. It is further understood that in order to ensure that the images are in focus requires that the fixture have another three degrees of freedom with respect to altering the position of the element 12; more specifically, the additional degrees of motion being translation perpendicular to the plane of the element, as well as azimuthal and elevational tilting. In addition, it is desirable that the alignment fixture 100 be stable over a range of temperatures and be able to withstand a level of mechanical shock and stress without deviating from its proper functionality.

As shown in FIG. 7, the liquid crystal element 12 and substrate holder 20 which are mounted to the wiring board 40, are releasably attached to the alignment fixture 100 by means of an adapter plate 102. An aligner base plate 104 is coupled to the adapter plate 102 in a similar manner, which is, more specifically, the receipt of pitched aligning studs 107 through the through holes 56 of the substrate holder, and alignment holes 103 and 109 of the adapter plate 102 and the aligner base plate 104, respectively. The studs 107 include an external threading, and may either be independently rotatable or may be coupleable to a nut 11 2 for relative adjustment.

The aligner base plate 104 comprises three eccentric levers 105, which are closely confined within receiving slots 106, and which are rotatable through an angle bounded by the receiving slots 106. Appropriate manipulation of the levers 105 alters the position of the adapter plate 102, and the substrate holder 20 beneath, therein providing for image superposition relative to other elements 12. Once properly aligned in this manner, the adjustment is locked into place by means of screws 108.

In order to provide focus alignment, the pitched aligning studs 107 are coupled to a prism assembly 110 such that manipulation of the studs 107 (or the corresponding nuts 11 2) alters the relative spacing of the prism 110 and the liquid crystal element 12. In addition, eccentric manipulation of the studs 107 provides azimuthal and/or elevational tilting. The focus alignment may be locked in place by means of clamps 111 which are attached to the aligner base plate 104.

It is understood that this alignment fixture 100 has inherent desirable thermal properties in that it is first attached to the prism assembly 110 via very short paths, i.e. the pitched alignment studs 107. Such a short path minimizes the magnitude of thermal expansion. In addition, the prism assembly 110 and the plurality of liquid crystal element assemblies attached thereto form a symmetrical structure which allows thermal effects to be distributed evenly over the plurality, thus again minimizing the distortional and misaligning effects of thermal expansion.

It is further understood that such an alignment device, as shown in FIG. 7, is very robust in that the means for aligning the elements can withstand large external forces without having the parts move relative to one another. Only specifically directed forces, applied prior to the locking of the proper position in place by either screws or clamps, can effect the orientation of the liquid crystal element 12.

Figure 8:
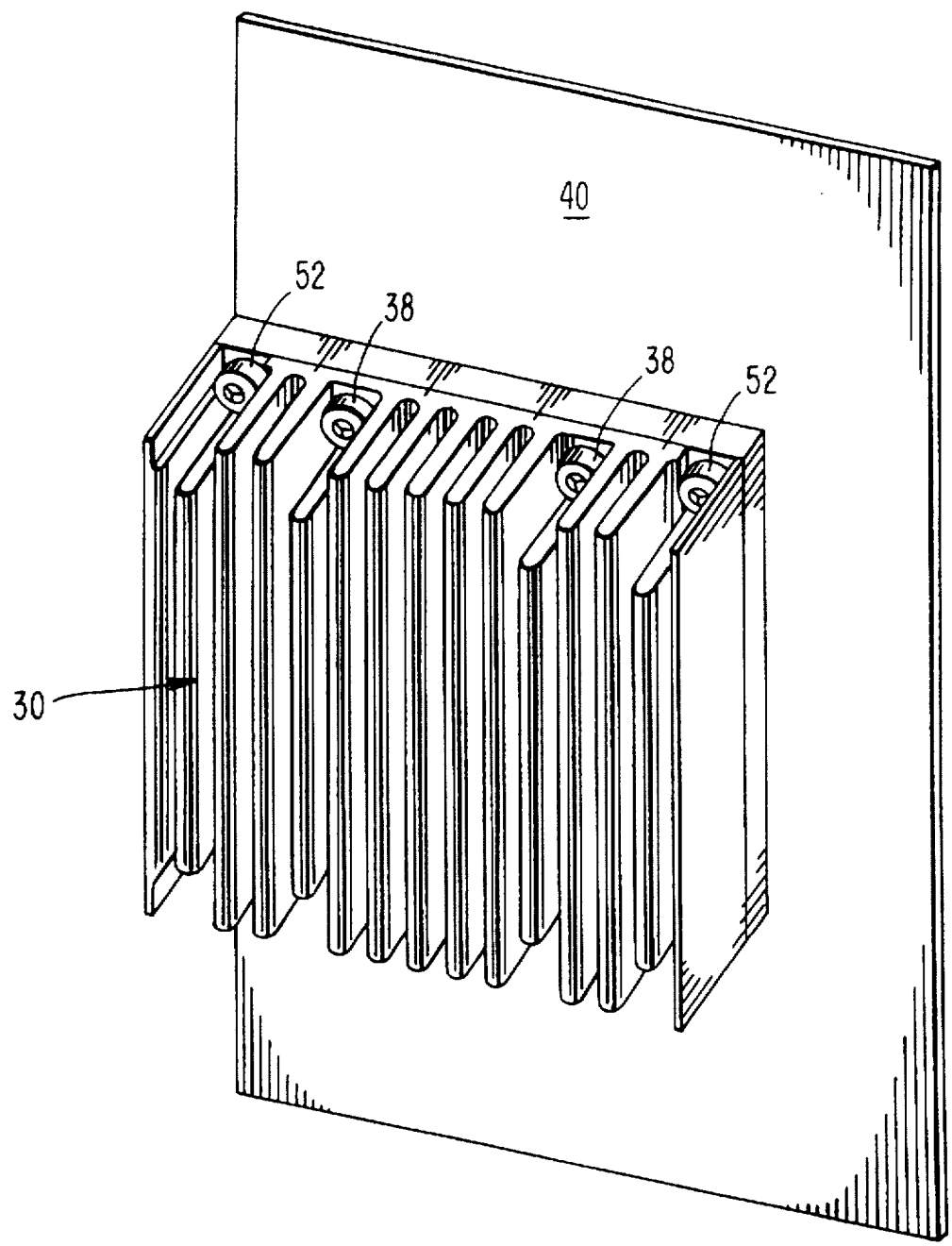
FIG. 8 is a view of the heat sink mounted to the rear of the substrate holder, in accordance with the structure and assembly process of the present invention.

Referring now to FIG. 8, the rear surface of the wiring board 40 is shown, with the heat sink 30 coupled to the back of the substrate holder 20, as was illustrated in a side view in FIG. 4. The heat sink 30 is coupled to the rear of the wiring board 40, after the proper positioning of the assembly 54, via screws 52. The holes in the wiring board 40, through which the screws 38 are placed, may be the same as the holes as were utilized to couple the alignment fixture 50 thereto, otherwise a separate set of holes may be provided.

The process of fabrication, assembly, and alignment, therefore, of the above described structure, comprise a plurality of steps. The process of fabricating the structure 7 itself comprises: (1) forming the appropriate microcircuitry on the surface of a semiconductor wafer; (2) forming an array of reflective pixels on top of the microcircuitry; (3) attaching the bottom of the wafer, or portions thereof, to an optically flat substrate; (4) forming edge seals on the top surface of the wafer; (5) providing a uniformly thick layer of electro-optically active liquid crystal on the top of the wafer; (6) positioning a transparent conductive layer, in substantially parallel relationship to the reflective surface; and (7) positioning a transparent insulative layer on top of the transparent conductive layer.

The process of assembling and aligning the structure 7, once fabricated, with the remaining optical and electrical elements of the display device comprises: (1) attaching driver chips and/or flexible circuitry to the semiconductor wafer; (2) attaching the element to a substrate holder; (3) loosely mounting the substrate holder to a wiring board, such that the structure is positioned in a cutout section of the board; (4) utilizing an adjustment fixture, aligning the driver chips and/or flexible circuitry to the bonding pads on the wiring board; (5) connecting the driver chips and/or flexible circuitry to the wiring board; (6) tightening the mounts of the substrate holder to the wiring board; (7) utilizing another adjustment fixture, temporarily mounted in contact with the element, the substrate holder, and the wiring board, for the purpose of adjusting the relative orientation of the liquid crystal element with respect to the other optical elements of the device; (8) attaching the assembly to a mounting device; and (9) coupling a heat sink to the rear of the substrate holder for the purposes of dissipating as much of the thermal build-up in the element as possible.

While there has been described and illustrated specific liquid crystal display elements, packaging therefor, heat sinks and alignment fixtures devices for use therewith, as well as methods of fabrication and assembly of the same, it will be apparent to those skilled in the art that variations and modifications are possible without deviating from the broad spirit and principle of the present invention which shall be limited solely by the scope of the claims appended hereto.

What is claimed is:

1. An alignment device for properly orienting liquid crystal elements comprising:

an adapter plate which is coupleable to the liquid crystal element;

an aligning base plate, which is coupleable to said liquid crystal element via said adapter plate, having at least one slot;

a prism assembly having at least one pitched aligning stud extending outwardly therefrom;

a plurality of aligned through holes in each of said liquid crystal element, adapter plate, and said aligning base plate, each of said aligned through holes being capable of slideably receiving therethrough said at least one stud;

at least one moveable eccentric element, mountable within said at least one slot of said aligning base plate, the movement of which alters the orientation of said liquid crystal element; and means for sliding the at least one stud relative to said liquid crystal element, adapter plate, and said aligning base plate, therein altering the orientation of said liquid crystal element.

2. The aligning device as set forth in claim 1, wherein the at least one pitched aligning stud comprises an external threading.

3. The aligning device as set forth in claim 1, wherein the means for sliding the at least one pitched aligning stud relative to said liquid crystal element, adapter plate, and said aligning base plate is a fine pitch nut which threadably engages the stud.

4. The alignment device as set forth in claim 1, wherein said at least one moveable eccentric element is rotatable through an angle bounded by said at least one slot.

5. The alignment device as set forth in claim 1, wherein said prism assembly and said liquid crystal element, adapter plate, and aligning base plate attached to said prism assembly form a symmetrical structure to evenly distribute heat.

6. The alignment device as set forth in claim 1, wherein said prism assembly and said liquid crystal element, adapter plate, and aligning base plate attached to said prism assembly form a symmetrical structure to minimize misalignment resulting from thermal expansion.

7. An alignment device for orienting a liquid crystal element comprising:

an adapter plate coupleable to the liquid crystal element;

an aligning base plate coupleable to the liquid crystal element via said adapter plate;

a prism assembly having a stud; said liquid crystal element, said adapter plate, and said aligning base plate having aligned holes for receiving said stud; and a moveable element mounted within a slot of said aligning base plate to alter orientation of said liquid crystal element;

said stud being moveable relative to said liquid crystal element, said adapter plate, and said aligning base plate for altering orientation of said liquid crystal element.

8. The alignment device as set forth in claim 7, wherein said moveable element is rotatable through an angle bounded by said slot.

9. The alignment device as set forth in claim 7, wherein said liquid crystal element, adapter plate, and aligning base plate form a symmetrical structure to evenly distribute heat.

10. The alignment device as set forth in claim 7, wherein said liquid crystal element, adapter plate, and aligning base plate form a symmetrical structure to minimize misalignment resulting from thermal expansion.

* * * * *